United States Patent [19]

Mink

[11] 3,948,848

[45] Apr. 6, 1976

[54] LOW TEMPERATURE SOLVENTLESS SILICONE RESINS

[75] Inventor: Alan E. Mink, Midland, Mich.

[73] Assignee: Dow Corning Corporation, Midland, Mich.

[22] Filed: Aug. 4, 1975

[21] Appl. No.: 601,781

[52] U.S. Cl. 260/37 SB; 260/46.5 UA; 260/448.2 H
[51] Int. Cl.$^2$............................................ C08L 83/04
[58] Field of Search .. 260/37 SB, 46.5 UA, 448.2 H

[56] References Cited
UNITED STATES PATENTS 3,844,992   10/1974   Antonen ................. 260/46.5 UA X Primary Examiner—Lewis T. Jacobs
Attorney, Agent, or Firm—Robert F. Fleming, Jr.

[57] ABSTRACT

Organosilicon resins having excellent thermal shock resistance in either the filled or unfilled state are obtained by curing mixtures of (A) a copolymer of (in mole percent) 35 to 42 monophenylsiloxane, 0 to 12 diphenylsiloxane, 35 to 50 dimethylsiloxane and 8 to 15 vinylmethylsiloxane with (B) a copolymer of (in mole percent) 8 to 15 diphenylsiloxane, 30 to 55 methylhydrogensiloxane, 28 to 45 dimethylsiloxane and 5 to 12 trimethylsiloxane in amount such that there is a stoichiometric amount of SiH and Si vinyl ± 10 percent of either ingredient. The preferred fillers are mixtures of 1/32 to 1/8 inch glass fibers and 2 to 8 microns crystalline silica.

10 Claims, No Drawings

LOW TEMPERATURE SOLVENTLESS SILICONE RESINS

BACKGROUND OF THE INVENTION

This invention relates to the field of solventless silicone resins. A solventless silicone resin is one that can be either applied to a surface or used as an impregnating or encapsulating resin without the necessity of diluting it with a solvent. Of the solventless resins the most commercially acceptable kind are those that are cured by the addition of SiH to Si vinyl. Such resins are useful in two major applications; namely, coating and encapsulation.

The properties of the resin needed to make a successful coating resin are different from those needed to make a successful impregnant or encapsulant. This is particularly true with regard to a phenomenon known as thermal shock. Thermal shock refers to the ability of the resin to withstand rapid changes in temperature over wide ranges. When a resin is used as a coating, the only contact between the resin and the substrate, usually metal, is at the surface of the two, hence, a difference in expansion and contraction of the resin and the substrate places stress only in one area of the resin. Furthermore, a coating resin is always in a thin film and as is well known, thin films are less subject to thermal shock than deep sections. On the other hand, an encapsulating or impregnating resin used in the electronic industries, for example, has component parts embedded within the resin matrix which parts may have widely different coefficients of expansions from that of the resin. Under such conditions fluctuations in temperature place an infinitely greater stress on the resin than is placed on a same resin in a coating use. For this reason, resins which are eminently satisfactory for coating applications, such as for use on traction motors, are completely inadequate as potting or encapsulating compounds for electrical or electronic equipment.

It is the object of this invention to produce a solventless silicone resin having improved thermal shock in both the filled and unfilled state which render it eminently useful as an encapsulating resin.

One of the things which must be considered in formulation of a solventless-type resin is not only the composition of the base resin, but also the composition of the crosslinker. For example, the same base resin may give entirely different thermal shock properties depending upon the composition of the crosslinker. The success of the resins of this invention is due to the crosslinkers used, particularly with respect to the dimethyl content.

PRIOR ART

Solventless resins of the SiH-vinyl type have been known since 1956 as is shown by U.S. pat. No. 2,915,497. In this patent the crosslinker, i.e. (1), is a phenyl-containing methylhydrogen compound and those described are devoid of dimethylsiloxane content.

A modification of solventless resins is shown in U.S. Pat. No. 3,631,220 in which the incompatibility problem between resin and crosslinker was solved by using certain alpha-methylstyryl modified organopolysiloxanes. The patent states that unless certain critical limitations in the molecular weight of the compatibilizing agent are employed, incompatibility results. Also, this patent relates to improving the thermal stability of solventless resins; namely, the stability of the composition at elevated temperatures against oxidative degradation.

A further modification is found in U.S. Pat. No. 3,732,330 which relates primarily to solventless resins designed for coating applications. Resins of this type have proved to be highly commercially successful in the coating of traction motors. However, the thermal shock resistance of the type of resin shown in this patent is woefully lacking when cured in deep section as is shown by comparative results hereinafter.

Copending application Serial Number 558,026, filed March 13, 1975, by Alan E. Mink and Darrell D. Mitchell relates to certain fast curing solventless resins which have excellent thermal shock resistance. However, in these resins the vinyl function of the SiH function are restricted to trisubstituted silicon atoms. Dimethylvinyl and dimethylhydrogensiloxanes are relatively more expensive than methylvinyl and methylhydrogensiloxanes, and also the fast curing properties of these resins are not always desirable for encapsulating applications. Therefore, there is a need for a less expensive organosilicon solventless resin and one which cures at higher temperatures but which have excellent thermal shock resistance. This application relates to the latter type of resin.

STATEMENT OF INVENTION

This application relates to a curable, resinous material comprising a mixture of (A) a copolymer of (in mole percent) 35 to 42 monophenylsiloxane, 0 to 12 diphenylsiloxane, 35 to 50 dimethylsiloxane and 8 to 15 vinylmethylsiloxane with (B) a copolymer of (in mole percent) 8 to 15 diphenylsiloxane, 30 to 55 methylhydrogensiloxane, 28 to 45 dimethylsiloxane and 5 to 12 trimethylsiloxane in amount such that there is a stoichiometric amount of SiH and Si vinyl ± 10 percent of either ingredient.

DETAILED DESCRIPTION OF THE INVENTION

The compositions of this invention can be cured by any convenient means which will cause the addition of siH to vinyl, such as, for example, the use of peroxides and rhodium catalysts, but the preferred catalysts known to applicant at this time are platinum catalysts. These well-known catalysts can be either inorganic compounds, such as platinum dispersed on charcoal or chloroplatinic acid, or organoplatinum compounds such as complexes of platinum with olefins or complexes of platinum with unsaturated organosilicon compounds or platinum sulfur complexes.

The catalysts can be incorporated in the resin in any desirable manner. If a one component package is desired, it is desirable to include inhibitors such as acetylenic alcohols or the like to prevent the premature curing of the composition. However, the composition can be commercialized as a two component package in which, generally, a mixture of (A) and (B) with or without filler is in one package and a mixture of (A) and the platinum catalyst is in a second package. The two ingredients are then mixed at the desired time and the composition cured by heating to the desired temperature, generally at 150°C. or higher.

As has been stated above, the resins of this invention give excellent shock resistance in the unfilled state and can be used as such either as coating or impregnating resins. However, it is advantageous both from an economic standpoint and also in certain cases from a thermal shock standpoint to incorporate fillers. The preferred fillers are glass fibers and finely divided crystalline silica.

Thus, this invention further relates to curable compositions comprising 35 to 65 percent by weight of (A) plus (B), 5 to 25 percent by weight glass fibers of 1/32 to ⅛ inch length and 10 to 50 percent by weight of 2 to 8 micron crystalline silica. An even more preferred composition is from 45 to 55 percent by weight (A) plus (B), 10 to 15 percent glass fibers and 30 to 45 percent finely divided silica. The glass fibers employed in this invention are preferably hammer milled glass which has an average length of from 1/32 to ⅛ inch. 1/16 inch is preferred. These fibers are commercially available. The preferred silica filler is a crushed quartz having an average particle size in the range of 2 to 8 microns with from 2 to 5 microns being preferred. These fillers are also commercially available.

The resins of this invention, both (A) and (B), are best made by the cohydrolysis of the corresponding chlorosilanes followed by a condensation of the product to reduce the hydroxyl content and to bring the resin to the desired viscosity. The hydrolysis and condensation are generally carried out in the presence of a hydrocarbon solvent such as toluene. For example, the mixed chlorosilanes in toluene solution can be added to water and after completion of the hydrolysis, the water layer removed and the toluene layer refluxed in the presence of an acid catalyst with the concurrent removal of water.

As stated above, the compositions of this invention are particularly adapted for encapsulating electrical and electronic devices, but they can also be used for coating compositions and for other applications in which silicone resins are normally used.

The thermal shock resistance of the compositions of this invention were tested by the following methods. A sample of the catalyzed resin was placed in a 2 inch diameter aluminim dish, deaired and gelled to the point of having the strength to support a steel washer. A washer 1 inch O.D., 7/16 inch I.D., 1/16 inch thick and weighing 6.6 g. is placed in the center of the dish atop the gel. An additional amount of composition was then poured onto the dish to provide a complete encapsulation of the washer. The total amount of resin or resin plus filler used was 25 g. The samples were then cured in an air-circulating oven and allowed to cool to room temperature and removed from the dish. The fracture temperature of the cured samples was then determined by thermal cycling which varied between one of two tests. In test I, the sample was cured at 100°C. for 16 hours and then placed in an oven and heated to 200°C. It was removed from the oven and allowed to cool to room temperature. The cooled sample was placed in a container along with a thermometer and the container was immersed in a dry ice bath. In this way, the temperature was gradually lowered and the temperature at which the sample fractured was recorded by reading the thermometer at the moment of fracture.

Test II involves encapsulating the washer as above and then curing the sample 90 minutes at 150°C. The sample is taken from the curing oven and immediately plunged into a cooling bath, which was either −50 to −75°C. The sample is then cycled between +150°C. and −50 or −75°C. for a given number of cycles or until cracking occurred. The number of cycles was recorded.

The term "equivalent amount" as used below means that the base resin and crosslinker were used in amount such that there was equal molar amounts of SiH and Si vinyl ± 10 percent.

The following examples are illustrative only and should not be construed as limiting the invention which is properly delineated in the appended claims.

EXAMPLE 1

This example shows the superiority of the unfilled resin of this invention over an unfilled coating resin of the type shown in U.S. Pat. No. 3,732,330. The resin of this invention was composed of a base resin (A) of 40 mole percent monophenylsiloxane, 10 mole percent diphenylsiloxane, 40 mole percent dimethylsiloxane and 10 mole percent vinylmethylsiloxane. The crosslinker (B) employed was a copolymer of 10 mole percent monophenylsiloxane, 35 mole percent dimethylsiloxane, 45 mole percent methylhydrogensiloxane and 10 mole percent trimethylsiloxane.

The resin used for comparison was a mixture of 37.5 mole percent monophenylsiloxane, 7.5 mole percent monomethylsiloxane, 30 mole percent dimethylsiloxane, 20 mole percent methylvinylsiloxane and 5 mole percent trimethylsiloxane and this was used with crosslinker composed of 35 mole percent diphenylsiloxane, 55 mole percent methylhydrogensiloxane and 10 mole percent trimethylsiloxane.

Each of these compositions was mixed with an appropriate amount of a platinum catalyst and used to encapsulate a washer as shown above. Each sample was then subjected to thermal shock test I described above, and the results are that the resins of this invention had a fracture temperature of −44°C. while the comparative resin had a fracture temperature of +150°C.

EXAMPLE 2

The base resin employed in this example was (A) of Example 1. This resin was mixed with the crosslinkers shown below in equivalent amount and in each case the same amount of the platinum catalyst was used and the combination of base resin and crosslinker was formulated with fillers in the amount of 50 percent by weight base resin plus crosslinker, 45 percent by weight of 2 to 3 micron crystalline silica and 5 percent by weight 1/32 inch hammer milled glass fibers. Each formulation was then put through thermal shock test II shown above and the results are given in the table below:

| Monophenyl-siloxane | Di-methyl-siloxane | Methylhydrogen-siloxane | Trimethyl-siloxane | No. of Cycles |
|---|---|---|---|---|
| 35 | 0 | 55 | 10 | failed |
| 10 | 15 | 65 | 10 | failed |
| 10 | 20 | 60 | 10 | failed |
| 10 | 25 | 55 | 10 | failed |
| 10 | 30 | 50 | 10 | 3 |
| 10 | 35 | 45 | 10 | 5 |

This example shows the criticality of the amount of dimethylsiloxane in the crosslinker with respect to thermal shock.

EXAMPLE 3

Resin (A) and crosslinker (B) of Example 1 were employed in this example together with a platinum catalyst and the filler combination shown below. In each case the formulated material was employed in thermal test II in which the temperature cycle was from +150 to −75°C. Sample (1) had not cracked after 5 and formulation (2) had not cracked after 10 cycles.

| Ingredients | Formulation (1) | Formulation (2) |
| --- | --- | --- |
| (A) | 55 | 43 |
| (B) | 9 | 7 |
| 2–3 micron crystalline silica | 10 | 37 |
| 1/16 inch glass fibers | 25 | 12 |
| black pigment | 1 | 1 |
| platinum catalyst* | 1 | 1 |

All amounts above are in parts by weight.
*Contains 0.4 percent by weight platinum.

EXAMPLE 4

This example shows the use of a base resin containing no diphenylsiloxane. The base resin employed in this example was a copolymer of 40 mole percent monophenylsiloxane, 48 mole percent dimethylsiloxane and 12 mole percent methylvinylsiloxane. The crosslinker employed was (B) of Example 1. The resin and crosslinker were mixed in equivalent amounts together with the fillers shown below and was found to go five cycles without cracking when tested according to test II shown above. The formulation was 40 parts by weight resin plus crosslinker, 47 parts by weight of 2 to 3 micron crystalline silica, 12 parts by weight 1/16 inch glass fibers, 1 part by weight black pigment and 1 part by weight platinum catalyst.

The cured resin had a shore D hardness of 60.

That which is claimed is:

1. A curable composition consisting essentially of a mixture of
   A. a copolymer of (in mole percent) 35 to 42 monophenylsiloxane, 0 to 12 diphenylsiloxane, 35 to 50 dimethylsiloxane and 8 to 15 vinylmethylsiloxane, and
   B. a copolymer of (in mole percent) 8 to 15 diphenylsiloxane, 30 to 55 methylhydrogensiloxane, 28 to 45 dimethylsiloxane and 5 to 12 trimethylsiloxane in amount such that there is a stoichiometric amount of SiH and Si vinyl ± 10 percent of either ingredient.
2. The cured composition of claim 1 in which a platinum catalyst is used as the curing agent.
3. A curable composition consisting essentially of, in percent by weight, 35 to 65 of (A) plus (B) of claim 1, 5 to 25 of glass fibers having an average length of from 1/32 to ⅛ inch and 10 to 50 of crystalline silica having an average particle size of 2 to 8 microns.
4. The composition of claim 3 which has been cured with a platinum catalyst.
5. A curable composition consisting essentially of, in percent by weight, 45 to 55 of (A) plus (B) of claim 1, 10 to 15 of 1/32 to ⅛ inch glass fibers and 30 to 45 of a crystalline silica having an average particle size of 2 to 8 microns.
6. The composition of claim 3 in which the glass fibers are 1/16 inch and the silica filler has an average particle size of 2 to 5 microns.
7. The composition of claim 5 in which the glass fibers have an average length of 1/16 inch and the silica has an average particle size of 2 to 5 microns.
8. The cured composition of claim 5.
9. The cured composition of claim 6.
10. The cured composition of claim 7.

* * * * *